United States Patent
Nesbitt

(10) Patent No.: US 6,695,718 B2
(45) Date of Patent: Feb. 24, 2004

(54) GOLF BALL WITH SULFUR CURED INNER CORE COMPONENT

(75) Inventor: R. Dennis Nesbitt, Westfield, MA (US)

(73) Assignee: The Top-Flite Golf Company, Chicopee, MA (US)

( * ) Notice: Subject to any disclaimer, the term of this patent is extended or adjusted under 35 U.S.C. 154(b) by 0 days.

(21) Appl. No.: 09/894,960

(22) Filed: Jun. 29, 2001

(65) Prior Publication Data

US 2002/0010037 A1 Jan. 24, 2002

Related U.S. Application Data

(63) Continuation-in-part of application No. 09/767,220, filed on Jan. 22, 2001, which is a continuation of application No. 09/048,701, filed on Mar. 26, 1998, now Pat. No. 6,213,895, application No. 09/894,960, which is a continuation-in-part of application No. 09/562,773, filed on May 2, 2000, now Pat. No. 6,495,633, which is a continuation of application No. 09/049,410, filed on Mar. 27, 1998, now Pat. No. 6,057,403, which is a continuation-in-part of application No. 08/926,872, filed on Sep. 10, 1997, which is a division of application No. 08/631,613, filed on Apr. 10, 1996, now Pat. No. 5,803,831, which is a continuation-in-part of application No. 08/591,046, filed on Jan. 25, 1996, now abandoned, which is a continuation-in-part of application No. 08/542,793, filed on Oct. 13, 1995, now abandoned, which is a continuation-in-part of application No. 08/070,510, filed on Jun. 1, 1993, now abandoned, application No. 09/894,960, which is a continuation-in-part of application No. 08/870,585, filed on Jun. 6, 1997, now abandoned, which is a continuation of application No. 08/556,237, filed on Nov. 9, 1995, now abandoned, which is a continuation-in-part of application No. 08/542,793, filed on Oct. 13, 1995, now abandoned, which is a continuation-in-part of application No. 08/070,510, filed on Jun. 1, 1993, now abandoned, said application No. 09/048,701, filed on Mar. 26, 1998.

(60) Provisional application No. 60/042,439, filed on Mar. 28, 1997.

(51) Int. Cl.[7] .............................................. A63B 37/06
(52) U.S. Cl. ...................................................... 473/374
(58) Field of Search ................................ 473/373, 374, 473/376, 367, 368, 377

(56) References Cited

U.S. PATENT DOCUMENTS

| 2,741,480 A | 4/1956 | Smith |
| 2,973,800 A | 3/1961 | Muccino |
| 3,053,539 A | 9/1962 | Piechowski |
| 3,264,272 A | 8/1966 | Rees |

(List continued on next page.)

FOREIGN PATENT DOCUMENTS

| CA | 2137841 | 6/1995 |
| EP | 0589647 | 3/1994 |
| EP | 0630665 | 12/1994 |
| EP | 0637459 | 2/1995 |
| GB | 494031 | 10/1938 |
| GB | 2245580 | 1/1992 |
| GB | 2248067 | 3/1992 |
| GB | 2264302 | 11/1992 |
| GB | 2291811 | 2/1996 |
| GB | 2291812 | 2/1996 |

OTHER PUBLICATIONS

A General Reference Manual, "The Chemistry of Polyurethane Coatings", Mobay Corporation, 1–16 (1988).

(List continued on next page.)

Primary Examiner—Mark S. Graham
Assistant Examiner—Raeann Gorden

(57) ABSTRACT

A golf ball is disclosed that includes a core assembly comprising a center core component and at least one core layer and a cover comprising at least one layer. The center core component preferably is formed from a sulfur-cured polybutadiene. The core layer component preferably is formed from a peroxide-cured polybutadiene and a metal salt of an unsaturated fatty acid such as zinc diacrylate or zinc dimethacrylate. The resulting golf ball of the present invention provides enhanced playability characteristics (i.e., spin and feel) without sacrificing distance or durability properties. The sulfur-cured center core component exhibits a remarkable combination of properties—a high resiliency coupled with being very soft.

15 Claims, 2 Drawing Sheets

U.S. PATENT DOCUMENTS

| | | | | |
|---|---|---|---|---|
| 3,313,545 | A | 4/1967 | Bartsch | |
| 3,373,123 | A | 3/1968 | Brice | |
| 3,384,612 | A | 5/1968 | Brandt et al. | |
| 3,395,109 | A | 7/1968 | Molitor et al. | |
| 3,421,766 | A | 1/1969 | Chmiel et al. | |
| 3,458,205 | A | 7/1969 | Smith et al. | |
| 3,502,338 | A | 3/1970 | Cox | |
| 3,534,965 | A * | 10/1970 | Harrison | 473/372 |
| 3,572,721 | A * | 3/1971 | Harrison | 473/373 |
| 3,572,722 | A * | 3/1971 | Harrison | 473/377 |
| 3,883,145 | A | 5/1975 | Cox et al. | |
| 3,979,126 | A | 9/1976 | Dusbiber | |
| 3,989,568 | A | 11/1976 | Isaac | |
| 4,076,255 | A | 2/1978 | Moore et al. | |
| 4,085,937 | A | 4/1978 | Schenk | |
| 4,123,061 | A | 10/1978 | Dusbiber | |
| 4,190,711 | A | 2/1980 | Zdrahala et al. | |
| 4,218,543 | A | 8/1980 | Weber et al. | |
| 4,248,432 | A | 2/1981 | Hewitt et al. | |
| 4,272,079 | A | 6/1981 | Nakada et al. | |
| 4,274,637 | A | 6/1981 | Molitor | |
| 4,337,946 | A | 7/1982 | Saito et al. | |
| 4,442,282 | A | 4/1984 | Kolycheck | |
| 4,431,946 | A | 7/1984 | Nesbitt | |
| 4,570,937 | A | 2/1986 | Yamada | |
| 4,582,887 | A | 4/1986 | Dominguez et al. | |
| 4,590,219 | A | 5/1986 | Nissen et al. | |
| 4,607,090 | A | 8/1986 | Dominguez | |
| 4,650,193 | A * | 3/1987 | Molitor et al. | 473/373 |
| 4,674,751 | A | 6/1987 | Molitor et al. | |
| 4,679,795 | A | 7/1987 | Melvin et al. | |
| 4,688,801 | A | 8/1987 | Reiter | |
| 4,690,981 | A | 9/1987 | Statz | |
| 4,695,055 | A | 9/1987 | Newcomb et al. | |
| 4,714,253 | A | 12/1987 | Nakahara et al. | |
| 4,762,322 | A | 8/1988 | Molitor et al. | |
| 4,798,386 | A | 1/1989 | Berard | |
| 4,848,770 | A * | 7/1989 | Shama | 473/373 |
| 4,852,884 | A | 8/1989 | Sullivan | |
| 4,858,923 | A | 8/1989 | Gobush et al. | |
| 4,858,924 | A | 8/1989 | Saito et al. | |
| 4,863,167 | A | 9/1989 | Matsuki et al. | |
| 4,878,674 | A | 11/1989 | Newcomb et al. | |
| 4,884,814 | A | 12/1989 | Sullivan | |
| 4,911,451 | A | 3/1990 | Sullivan et al. | |
| 4,919,434 | A | 4/1990 | Saito | |
| 4,955,966 | A | 9/1990 | Yuki et al. | |
| 4,957,297 | A | 9/1990 | Newcomb et al. | |
| 4,979,746 | A | 12/1990 | Gentiluomo | |
| 4,984,804 | A | 1/1991 | Yamada et al. | |
| 4,986,545 | A | 1/1991 | Sullivan | |
| 5,002,281 | A | 3/1991 | Nakahara et al. | |
| 5,006,297 | A | 4/1991 | Brown et al. | |
| 5,019,319 | A | 5/1991 | Nakamura et al. | |
| 5,026,067 | A | 6/1991 | Gentiluomo | |
| 5,035,425 | A | 7/1991 | Edwards | |
| 5,045,591 | A | 9/1991 | Meyer et al. | |
| 5,048,838 | A | 9/1991 | Chikaraishi et al. | |
| 5,068,151 | A | 11/1991 | Nakamura et al. | |
| 5,072,944 | A | 12/1991 | Nakahara et al. | |
| 5,096,201 | A | 3/1992 | Egashira et al. | |
| 5,098,105 | A | 3/1992 | Sullivan | |
| 5,104,126 | A | 4/1992 | Gentiluomo | |
| 5,120,791 | A | 6/1992 | Sullivan | |
| 5,142,835 | A | 9/1992 | Mrocca | |
| 5,150,906 | A | 9/1992 | Molitor | |
| 5,156,405 | A | 10/1992 | Kitaoh et al. | |
| 5,184,828 | A | 2/1993 | Kim et al. | |
| 5,187,013 | A | 2/1993 | Sullivan | |
| 5,197,740 | A | 3/1993 | Pocklington et al. | |
| 5,219,973 | A | 6/1993 | Slack et al. | |
| 5,222,739 | A | 6/1993 | Horiuchi et al. | |
| 5,244,969 | A | 9/1993 | Yamada | |
| 5,253,871 | A | 10/1993 | Viollaz | |
| 5,273,286 | A | 12/1993 | Sun | |
| 5,273,287 | A | 12/1993 | Molitor et al. | |
| 5,274,041 | A | 12/1993 | Yamada | |
| 5,281,651 | A | 1/1994 | Arjunan et al. | |
| 5,300,334 | A | 4/1994 | Niederst et al. | |
| 5,304,608 | A | 4/1994 | Yabuki et al. | |
| 5,306,760 | A | 4/1994 | Sullivan | |
| 5,312,857 | A | 5/1994 | Sullivan | |
| 5,314,187 | A | 5/1994 | Proudfit | |
| 5,324,783 | A | 6/1994 | Sullivan | |
| 5,330,837 | A | 7/1994 | Sullivan | |
| 5,334,673 | A | 8/1994 | Wu | |
| 5,338,610 | A | 8/1994 | Sullivan | |
| 5,368,304 | A | 11/1994 | Sullivan et al. | |
| 5,368,806 | A | 11/1994 | Harasin et al. | |
| 5,387,750 | A | 2/1995 | Chiang | |
| 5,403,010 | A | 4/1995 | Yabuki et al. | |
| 5,439,227 | A | 8/1995 | Egashira et al. | |
| 5,482,155 | A | 1/1996 | Molitor et al. | |
| 5,482,285 | A | 1/1996 | Yabuki et al. | |
| 5,484,870 | A | 1/1996 | Wu | |
| 5,490,673 | A | 2/1996 | Hiraoka | |
| 5,490,674 | A | 2/1996 | Hamada et al. | |
| 5,492,972 | A | 2/1996 | Stefani | |
| 5,553,852 | A | 9/1996 | Higuchi et al. | |
| 5,556,098 | A | 9/1996 | Higuchi et al. | |
| 5,586,950 | A | 12/1996 | Endo | |
| 5,628,699 | A | 5/1997 | Maruko et al. | |
| 5,633,322 | A | 5/1997 | Yabuki et al. | |
| 5,663,235 | A | 9/1997 | Tanaka | |
| 5,668,239 | A | 9/1997 | Nodelman et al. | |
| 5,674,137 | A | 10/1997 | Maruko et al. | |
| 5,683,312 | A | 11/1997 | Boehm et al. | |
| 5,688,191 | A | 11/1997 | Cavallaro et al. | |
| 5,688,192 | A * | 11/1997 | Aoyama | 473/374 |
| 5,688,595 | A | 11/1997 | Yamagishi et al. | |
| 5,692,974 | A | 12/1997 | Wu et al. | |
| 5,695,413 | A | 12/1997 | Yamagishi et al. | |
| 5,702,311 | A | 12/1997 | Higuchi et al. | |
| 5,704,854 | A | 1/1998 | Higuchi et al. | |
| 5,713,802 | A | 2/1998 | Moriyami et al. | |
| 5,730,665 | A | 3/1998 | Shimosaka et al. | |
| 5,733,206 | A | 3/1998 | Nesbitt et al. | |
| 5,733,428 | A | 3/1998 | Calabria et al. | |
| 5,739,247 | A | 4/1998 | Lesko et al. | |
| 5,739,253 | A | 4/1998 | Nodelman et al. | |
| 5,750,580 | A | 5/1998 | Mayer et al. | |
| 5,759,676 | A | 6/1998 | Cavallaro et al. | |
| 5,779,561 | A | 7/1998 | Sullivan et al. | |
| 5,779,562 | A | 7/1998 | Melvin et al. | |
| 5,779,563 | A | 7/1998 | Yamagashi et al. | |
| 5,783,293 | A | 7/1998 | Lammi | |
| 5,792,208 | A | 8/1998 | Gray | |
| 5,797,808 | A | 8/1998 | Hayashi et al. | |
| 5,800,284 | A | 9/1998 | Sullivan et al. | |
| 5,803,831 | A | 9/1998 | Sullivan et al. | |
| 5,810,678 | A | 9/1998 | Cavallaro et al. | |
| 5,813,923 | A | 9/1998 | Cavallaro et al. | |
| 5,816,937 | A | 10/1998 | Shimosaka et al. | |
| 5,820,488 | A | 10/1998 | Sullivan et al. | |
| 5,820,489 | A | 10/1998 | Sullivan et al. | |
| 5,820,491 | A | 10/1998 | Hatch et al. | |

| | | |
|---|---|---|
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |
| 5,919,100 A | 7/1999 | Boehm et al. |
| 5,919,862 A | 7/1999 | Rajagopalan |
| 5,922,252 A | 7/1999 | Stanton et al. |
| 5,929,189 A | 7/1999 | Ichiwaka et al. |
| 5,935,021 A | 8/1999 | Kashiwagi et al. |
| 5,947,842 A | 9/1999 | Cavallaro et al. |
| 5,947,843 A | 9/1999 | Calabria et al. |
| 5,959,059 A | 9/1999 | Vedula et al. |
| 5,976,035 A | 11/1999 | Umezawa et al. |
| 5,984,807 A | 11/1999 | Wai et al. |
| 6,184,301 B1 * | 2/2001 | Shindo .................. 473/373 |
| 6,390,936 B1 * | 5/2002 | Sugimoto ............... 473/374 |

OTHER PUBLICATIONS

Product Announcement, "New Polyrea System Offering Rapid Mold Times and Excellent Thermal Stability for Automotive Fascias is Introduced by Mobay", PRNewswire, Mar. 1, 1998.

Cytec Industries, Inc., "TMXDI® (META) Aliphatic Isocyanates", brochure pp. 2–11, 9/94.

Bayer Corporation, "Engineering Polymers RIM and Part Mold Design", brochure, pp. 1–85, May 1995.

Bayer Corporation, "Engineering Polymers Properties Guide Thermoplastics and Polyurethanes", brochure, pp. 2–7, 28–29.

A Properties Guide, "Engineering Polymers Thermoplastics and Thermosets", Miles Inc., 1–23 (1994).

Polyurethane Handbook, "Chemistry–Raw Materials—Processing Applications–Properties", edited by Oertel et al., Hanser/Gardner Publications, Inc., 101,102 (1994).

Translated Claims for JP 1,795,357 publ. Jan. 19, 1993.

DuPont Nucrel 035 Resin, DuPont Company, Wilmington, DE 1989 (no date).

Escor Acid Terpolymers, Exxon Chemical Co.

Translated Claims for JP 1,771,941 publ. Aug. 6, 1992.

* cited by examiner

GOLF BALL WITH SULFUR CURED INNER CORE COMPONENT

CROSS REFERENCES TO RELATED APPLICATIONS

This application is a continuation in part of U.S. application Ser. No. 09/767,220 filed on Jan. 22, 2001, which is a continuation of U.S. application Ser. No. 09/048,701 filed Mar. 26, 1998, now U.S. Pat. No. 6,213,895, which claims priority from U.S. provisional patent application Ser. No. 60/042,439 filed Mar. 28, 1997.

This application is a continuation in part of U.S. application Ser. No. 09/562,773 filed May 2, 2000, now U.S. Pat. No. 6,495,633 which is a continuation of U.S. application Ser. No. 09/049,410 filed on Mar. 27, 1998, now U.S. Pat. No. 6,057,403, which is a continuation-in-part of U.S. application Ser. No. 08/926,872 filed on Sep. 10, 1997, which is a divisional of U.S. application Ser. No. 08/631,613 filed on Apr. 10, 1996, now U.S. Pat. No. 5,803,831, which in turn is a continuation-in-part of U.S. application Ser. No. 08/591,046 filed on Jan. 25,1996, now abandoned, and U.S. application Ser. No. 08/542,793 filed on Oct. 13, 1995, now abandoned, which in turn is a continuation-in-part of U.S. application Ser. No. 08/070,510 filed Jun. 1, 1993, now abandoned.

This application is a continuation in part of U.S. application Ser. No. 08/870,585 filed on Jun. 6, 1997, now abandoned which is a continuation of U.S. application Ser. No. 08/556,237 filed on Nov. 9, 1995, now abandoned, which is a continuation-in-part of U.S. application Ser. No. 08/542,793 filed Oct. 13, 1995, now abandoned, which is a continuation-in-part of U.S. application Ser. No. 08/070,510 filed on Jun. 1, 1993, now abandoned.

FIELD OF THE INVENTION

The present invention relates to golf balls and, more particularly, to improved golf balls comprising a unique core assembly that utilizes a sulfur cured inner core component. The improved golf balls exhibit enhanced distance and durability properties.

BACKGROUND OF THE INVENTION

Golf balls traditionally have been categorized in three different groups, namely, as one piece balls, multi-piece solid (two or more pieces) balls, and wound (three piece) balls.

The one-piece ball typically is formed from a solid mass of moldable material which has been cured to develop the necessary degree of hardness. The one-piece ball possesses no significant difference in composition between the interior and exterior of the ball. These balls do not have an enclosing cover. One piece balls are described, for example, in U.S. Pat. No. 3,313,545; U.S. Pat. No. 3,373,123; and U.S. Pat. No. 3,384,612.

The wound ball is frequently referred to as a three piece ball since it is produced by winding vulcanized rubber thread under tension around a solid or semi-solid center to form a wound core and thereafter enclosed in a single or multi-layer covering of tough protective material. For many years the wound ball satisfied the standards of the U.S.G.A. and was desired by many skilled, low handicap golfers.

The three piece wound ball typically has a balata cover which is relatively soft and flexible. Upon impact, it compresses against the surface of the club producing high spin. Consequently, the soft and flexible balata covers along with wound cores provide an experienced golfer with the ability to apply a spin to control the ball in flight in order to produce a draw or a fade or a backspin which causes the ball to "bite" or stop abruptly on contact with the green. Moreover, the balata cover produces a soft "feel" to the low handicap player. Such playability properties of workability, feel, etc., are particularly important in short iron play and low swing speeds and are exploited significantly by highly skilled players.

However, a three-piece wound ball has several disadvantages. For example, a wound ball is relatively difficult to manufacture due to the number of production steps required and the careful control which must be exercised in each stage of manufacture to achieve suitable roundness, velocity, rebound, "click", "feel", and the like.

Additionally, a soft wound (three-piece) ball is not well suited for use by the less skilled and/or high handicap golfer who cannot intentionally control the spin of the ball. For example, the unintentional application of side spin by a less skilled golfer produces hooking or slicing. The side spin reduces the golfer's control over the ball as well as reducing travel distance.

Similarly, despite all of the benefits of balata, balata covered balls are easily cut and/or damaged if mishit. Consequently, golf balls produced with balata or balata containing cover compositions can exhibit a relatively short life span. As a result of this negative property, balata and its synthetic substitute, trans-polyisoprene, and resin blends, have been essentially replaced as the cover materials of choice by golf ball manufacturers by materials comprising ionomeric resins and other elastomers such as polyurethanes.

Conventional multi-piece solid golf balls, on the other hand, include a solid resilient core having single or multiple layers employing different types of material molded on the core. The one-piece golf ball and the solid core for a multi-piece solid (non-wound) ball frequently are formed from a combination of materials such as polybutadiene and other rubbers cross-linked with zinc diacrylate (ZDA) or zinc dimethacrylate (ZDMA), and containing fillers and curing agents which are molded under high pressure and temperature to provide a ball of suitable hardness and resilience. For multi-piece non-wound golf balls, the cover typically contains a substantial quantity of ionomeric resins that impart toughness and cut resistance to the covers.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, such as durability, for golf ball cover construction. However, some of the advantages gained in increased durability have been offset to some degree by decreases in playability. This is because, although the ionomeric resins are very durable, they also tend to be quite hard when utilized for golf ball construction and thus lack the degree of softness required to impart the spin necessary to control the ball in flight. Since most ionomeric resins are harder than balata, the ionomeric resin covers do not compress as much against the face of the club upon impact, thereby producing less spin. In addition, the harder and more durable ionic resins lack the "feel" characteristic associated with the softer balata related covers.

As a result, there are currently more than fifty (50) commercial grades of ionomers available, both from DuPont and Exxon, with a wide range of properties which vary according to the type and amount of metal ions, molecular weight, composition of the base resin (i.e. relative content of ethylene and methacrylic and/or acrylic acid groups) and additive ingredients, such as reinforcement agents, etc. A great deal of research continues in order to develop golf ball cover compositions exhibiting not only the improved impact resistance and carrying distance properties produced by the "hard" ionomeric resins, but also the playability (i.e. "spin", "feel", etc.) characteristics previously associated with the "soft" balata covers, properties which are still desired by the more skilled golfer.

Most professional golfers and good amateur golfers desire a golf ball that provides good distance when hit off a driver, control and stopping ability on full iron shots, and high spin for short "touch and feel" shots. Many conventional two-piece and thread wound performance golf balls have undesirable high spin rates on full shots. The excessive spin on full shots is a sacrifice made in order to achieve more spin on the shorter touch shots. Consequently, it would be desirable to produce a multi-piece golf ball that exhibited low spin on full iron and wood shots and high spin in the "touch" and "feel" shots which occur with the high lofted irons and wedges around the green.

Accordingly, a wide variety of golf balls have been designed and are available to suit an individual player's game. In essence, different types of balls have been specifically designed or "tailor made" for high handicap versus low handicap golfers, men versus women, seniors versus juniors, etc. Moreover, improved golf balls are continually being produced by golf ball manufacturers with technological advancements in materials and manufacturing processes.

Although these highly specific balls satisfy many of the playing demands of the consumer group to whom the balls are directed, there still remains a need for an improved golf ball.

Moreover, a number of multi-piece solid balls have also been produced to address the various needs of the golfing populations. The different types of material used to formulate the core(s), cover(s), etc. of these balls dramatically alters the balls' overall characteristics.

In this regard, various structures have been suggested using multi-layer cores and single layer covers wherein the core layers have different physical characteristics. For example, U.S. Pat. Nos. 4,714,253; 4,863,167 and 5,184,828 relate to three-piece solid golf balls having improved rebound characteristics in order to increase flight distance. The '253 patent is directed towards differences in the hardness of the layers. The '167 patent relates to a golf ball having a center portion and an outer layer having a high specific gravity. Preferably, the outer layer is harder than the center portion. The '828 patent suggests that the maximum hardness must be located at the interface between the core and the mantle, and the hardness must then decrease both inwardly and outwardly.

Similarly, a number of patents for multi-piece solid balls suggest improving the spin and feel by manipulating the core construction. For example, U.S. Pat. No. 4,625,964 relates to a solid golf ball having a core diameter not more than 32 mm, and an outer layer having a specific gravity lower than that of the core. In U.S. Pat. No. 4,650,193, it is suggested that a curable core elastomer be treated with a cure-altering agent to soften an outer layer of the core. U.S. Pat. No. 5,002,281 is directed towards a three-piece solid golf ball which has an inner core having a specific gravity greater than 1.0, but less than or equal to that of the outer shell which must be less than 1.3. U.S. Pat. Nos. 4,848,707 and 5,072,944 disclose three-piece solid golf balls having a center and an outer layer of different hardness. Other examples of such dual layer cores can be found in, but are not limited to, the following patents: U.S. Pat. Nos. 4,781,383; 4,858,924; 5,002,281; 5,048,838; 5,104,126; 5,273,286; 5,482,285 and 5,490,674. It is believed that all of these patents are directed to balls with single cover layers.

Although satisfactory in many respects, a need still exists for a golf ball which exhibits an improved combination of properties that would lead to overall better playability, "feel" and sound (i.e. "click" sound when struck with a club) over currently available golf balls.

SUMMARY OF THE INVENTION

The present invention satisfies the noted objectives and provides, in a first aspect, a golf ball comprising a center core component formed from a polybutadiene and a sulfur curing agent. The golf ball further comprises at least one core layer disposed about the center core component. The core layer component is preferably formed from a polybutadiene and a peroxide curing agent. The golf ball further comprises at least one cover layer disposed over the core layer.

In another aspect, the present invention provides a golf ball comprising a spherical inner core or center component formed from a particular polybutadiene and one or more specific types of sulfur curing agents. The golf ball further comprises one or more core layers disposed on the inner core component. The core layer is formed from a particular type of polybutadiene and one or more specific types of peroxide curing agents.

And in yet another aspect, the present invention provides a golf ball comprising an inner core component, at least one core layer formed about the inner core, and at least one cover layer on the core layer. The inner core is formed from a sulfur curing agent and exhibits a Shore A hardness of from about 60 to about 90. The core layer is formed from a peroxide curing agent and is significantly harder than the inner core. The core layer has a Shore D hardness of from about 40 to about 60.

Accordingly, one aspect or feature of the present invention to provide a multi-piece, non-wound, solid core golf ball. The preferred core uses a multi-layer construction that includes two or more polymeric components, with at least one of the components being sulfur cured. The polymeric components that comprise the core are such that the moment of inertia may be adjusted to enhance the spin properties of the ball.

Another aspect or feature of the present invention is to provide a golf ball construction that utilizes a multi-layer core assembly enclosed by a multi-layer cover. The ball uses a multi-layer cover with an appropriate cover hardness and a core assembly having a core moment of inertia that produces a good "roll" when struck with a driver. However, the multi-layer cover is sufficiently soft to permit deformation upon impact with a club, thereby increasing the contact area between the ball and club, resulting in less scuffing and more resistance to undesirable cover cutting or abrasion.

Another aspect of the present invention is combining a dual core assembly and a multi-layer cover in such a manner as to achieve desirable features associated with certain previously known golf balls.

A further aspect is the provision for a golf ball having a soft outer cover layer with good scuff resistance and cut resistance coupled with relatively high spin rates at low club head speeds.

Another feature of the present invention is the provision of a dual core component golf ball wherein the center core component has a lower specific gravity than the outer layer core component.

Another aspect of the present invention is the provision of a dual core component golf ball wherein the outer layer core component of the dual core component has a specific gravity that is greater than the specific gravity of the outer cover layer of the golf ball.

Yet another feature of the present invention is the provision of a dual core component golf ball with a multi-layer cover disposed about the dual core component wherein the outer layer of the multi-layer cover has a Shore D hardness that is less than the Shore D hardness of the inner cover layer of the multi-layer cover.

Still another aspect of the present invention is the provision of a dual core component golf ball with a multi-layer cover in such a manner as to incorporate a desired moment of inertia.

Further scope of the applicability of the present invention will become apparent from the detailed description given hereinafter. It should, however, be understood that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENTS

Figure 1:
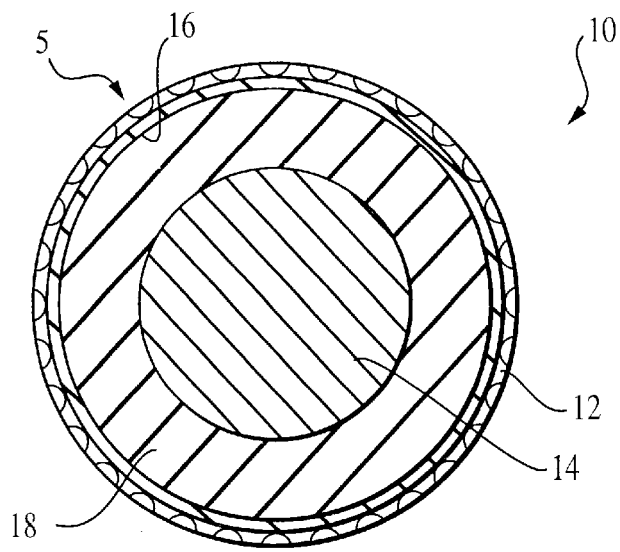
FIG. 1 is a cross-sectional view of a preferred embodiment golf ball in accordance with the present invention illustrating a dual core assembly and a cover comprising an inner layer and an outer dimpled layer.

The present invention is directed to a novel golf ball comprising a unique core assembly that utilizes a center component of polybutadiene that is sulfur cured. One or more core layers are also present utilizing polybutadiene which is peroxide cured. The golf balls of the present invention possess a unique combination of properties, including a high coefficient of restitution (C.O.R.), a low moment of inertia (M.O.I.), good sound ("click") and feel, and a high spin rate on short iron shots.

The coefficient of restitution (C.O.R.) in solid core balls is a function of the composition of the molded core and of the cover. In balls containing a dual core (i.e., balls comprising an interior spherical center component, a core layer disposed about the spherical center component, and a cover), the coefficient of restitution is a function of not only the composition of the cover, but also of the composition and physical characteristics of the interior spherical center component and core layer. Both the dual core and the cover contribute to the coefficient of restitution of the golf balls of the present invention.

In this regard, the coefficient of restitution of a golf ball is generally measured by propelling a ball at a given speed against a hard surface and measuring the ball's incoming and outgoing velocities electronically. Specifically, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e., speed off the club) exceeding 255 feet per second. Since the coefficient of restitution of a ball is related to the ball's initial velocity, it is highly desirable to produce a ball having a sufficiently high coefficient of restitution to closely approach the U.S.G.A. limit on initial velocity, while having an ample degree of softness (i.e., hardness) to produce enhanced playability (i.e., spin, etc.).

Coefficient of restitution (C.O.R.) is measured by firing the resulting golf ball in an air cannon at a velocity of 125 feet per second against a steel plate which is positioned 12 feet from the muzzle of the cannon. The rebound velocity is then measured. The rebound velocity is divided by the forward velocity to give the coefficient of restitution.

The moment of inertia (i.e., "MOI") of a golf ball (also known as "rotational inertia") is the sum of the products formed by multiplying the mass (or sometimes the area) of each element of a figure by the square of its distance from a specified line such as from the center of a golf ball. This property is directly related to the "radius of gyration" of a golf ball which is the square root of the ratio of the moment of inertia of a golf ball about a given axis to its mass. It has been found that the lower the moment of inertia (or the closer the radius of gyration is to the center of the ball) the higher the spin rate is of the ball with all other properties being held equally.

More particularly, the moment of inertia for the golf balls of the present invention is defined as the sum of the products formed by multiplying the mass of each element or component by the square of its distance from a specified line or point. This is also known as rotational inertia. Since the present invention golf balls comprise a number of components, the MOI of the resulting golf ball is equal to the sum of the moments of inertia of each of its various components, taken about the same axis or point. All of the moments of inertia of golf balls referred to herein are with respect to, or are taken with regard to, the geometric center of the golf ball.

As explained in greater detail herein, preferred embodiment golf balls in accordance with the present invention that exhibit a relatively low MOI, utilize an inner core having a relatively high specific gravity. And, due to the overall weight specifications set by the USGA, a high specific gravity core formulation generally limits the size of the core. Accordingly, in view of the typical specific gravity values of an inner core for a low MOI ball, such inner cores generally have a diameter of about 0.845 inches.

Alternatively, for high MOI golf balls which can also be produced in accordance with the present invention, the inner core preferably has a relatively low specific gravity, such as about 1.015. It has been found that it is difficult to obtain a core having a specific gravity less than 1.0 that remains solid. However, it is possible to reduce the specific gravity of the core to less than 1.0 by using micro balloons, a cellular foam construction, or other density reducing fillers.

The term "density reducing filler" as used herein refers to materials having relatively low densities, i.e., that are lightweight or have a specific gravity less than the specific gravity of the base polybutadiene rubber. Typically, polybutadiene has a specific gravity of about 0.91. Examples of density reducing filler materials include lightweight filler materials typically used to reduce the weight of a product in which they are incorporated. Specific examples include, for instance, foams and other materials having a relatively large void volume. Typically, such filler materials have specific gravities less than 1.0.

Details concerning several additional measurements referred to herein are as follows.

PGA compression is determined by applying a standard compressive force to the ball. A ball which exhibits no deflection (0.0 inches in deflection) under this force is rated 200, while a ball which deflects a test maximum of 0.200 inches is rated 0. Every incremental change of 0.001 inches in deformation represents a one point drop in the PGA compression rating of the ball. Consequently, a ball which deflects 0.1 inches (100×0.001 inches) has a PGA compression rating of 100 (i.e., 200–100) and a ball which deflects 0.110 inches (110×0.001 inches) has a PGA compression rating of 90 (i.e., 200–110).

Specifically, PGA compression is determined by placing a golf ball in an apparatus which has the form of a small press with an upper and lower anvil. The upper anvil is at rest against a 200 pound spring die, and the lower anvil has a range of linear travel of about 0.300 inches by means of a crank mechanism. In its open position, the gap between the anvils is sufficient to allow a clearance of at least 0.100 inches for insertion of the test ball. As the lower anvil is raised by the crank and the gap is closed, the apparatus applies compressive force and presses the ball against the spring loaded upper anvil. When the equilibrium point of the spring is reached the deflection of the upper anvil is measured with a micrometer. When testing a ball where deflection of the upper anvil is 0.100 inches, the ball will be regarded as having a PGA compression of "0". In practice, tournament quality balls have compression ratings about 50 to 100 which means that the upper anvil was deflected a total of 0.100 to 0.150 inches.

Alternative devices have also been employed to determine compression. For example, Applicant also utilizes a modified Riehle Compression Machine originally produced by Riehle Bros. Testing Machine Company, Philadelphia, Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression testers. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression =160 −Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

"Shore D (or Shore A or Shore C) hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

CORE ASSEMBLY

As previously noted, the core assembly of the preferred embodiment golf balls comprises a center core component about which is disposed a core layer. One or more additional core layers may also be disposed about the core component. In accordance with the present invention, the center core component comprises a sulfur cured polybutadiene. And, a peroxide cured polybutadiene is utilized in the one or more core layers disposed about the center core component.

A significant advantage provided by the preferred embodiment sulfur cured inner cores is that such cores are very soft, i.e. having a relatively low PGA compression, yet exhibit very high resilience, i.e. display drop rebounds significantly higher than those corresponding to rebounds associated with conventional cores comprising zinc diacrylate and of the same hardness.

Charles Goodyear first reported the process of vulcanization in 1844 in U.S. Pat. No. 3,633. The process disclosed in that patent was to heat a natural rubber and then treat it with an amount of sulfur and lead carbonate to form a rubber with improved physical properties. In order to increase the strength of a natural rubber, the natural rubber can be cross-linked during vulcanization.

In addition to a cross-linking agent, the vulcanization process may also include an accelerator in order to reduce the time necessary for cross-linking. Typical accelerators that have been used include mercaptobenzothiazoles, sulfenamides, dithiocarbamates, thiuram sulfides, guanidines, thioureas, xanthates, dithiophosphates, aldehyde-amines, as well as numerous others. Additional examples are discussed below.

Sulfur, in some instances, is a desirable cross-linking agent for vulcanization of natural rubbers because it provides the newly formed rubber articles with increased strength and excellent resistance to failure when flexed. Insoluble sulfur may be used in natural rubber compounds in order to promote adhesion, which is necessary for certain applications. These insoluble sulfur rubber mixtures, however, must be kept cool (<100° C.) or the amorphous polymeric form converts to rhombic crystals, which may destroy building tack and lead to failure of the bond. In addition to insoluble sulfur, sulfur donors may be used. Examples of sulfur donors include 4-morpholinyl-2-benzothiazole disulfide (MBSS), dipentamethylenethiuram hexasulfide (DPTH) and thiuram disulfides. These sulfur donors donate one atom of sulfur from their molecular structure for cross-linking purposes and thus provide thermal stability.

Examples of preferred sulfur curing agents include, but are not limited to N-oxydiethylene 2-benzothiazole sulfenamide, N,N-diorthotolyguanidine, bismuth dimethyldithiocarbamate, N-cyclohexyl 2-benzothiazole sulfenamide, N,N-diphenylguanidine, or combinations thereof.

Peroxides can also be used as a cross-linking agent for natural rubbers because peroxides give carbon-carbon cross-links, which can provide rubber articles with increased resistance to heat, oxygen and compression set. Peroxides can be advantageous in cross-linking in that they can be used in polymer blends and also with fully saturated polymers that cannot be cross-linked by other methods. In peroxide cross-linking, exposure to air is generally avoided, sometimes by means of an antioxidant, such as polymerized 1,2-dihydro -2,2,4-trimethylquinoline. Coagents, such as polybutadiene or multifunctional methacrylates, can also be used with peroxides to increase the state of cure.

In comparing the physical attributes of sulfur vulcanizing agents versus peroxide cross-linking agents, there are clear differences in the physical characteristics. For example, the molecular weights of vulcanizing agents (outside of insoluble sulfur) are generally lower than peroxide cross-linking agents. Further, the density of most of the vulcanizing agents is higher than the density of the peroxide cross-linking agents. Table 1 set forth below lists various physical properties of vulcanizing agents and peroxides.

TABLE 1*

| Agent | CAS Registry Number | Molecular Weight | Density, mg/m$^3$ | Melting Point, °C. | Acute oral LD$_{50}$, mg/kg |
|---|---|---|---|---|---|
| Vulcanizing Agents | | | | | |
| sulfur | [10544-50-0] | 256 | 2.07 | ~95 | |
| insoluble sulfur | [9035-99-8] | >200,000 | 1.95 | ~115 | |
| 4,4"-dithio-dimorpholine | [103-34-4] | 236 | 1.35 | 123–131 | 5,600 |
| N,N-caprolactum disulfide | [23847-08-7] | 288 | 1.3 | >120 | 3,620 |
| Peroxides | | | | | |
| dicumyl peroxide | [80-43-3] | 270 | 1.00 | | 4,100 |
| 2,5-dimethyl-2,5-di(t-butyl-peroxy)hexane | [78-63-7] | 290 | 0.87 | liquid | >32,000 |
| 2,5-dimethyl-2,5-di(t-butyl-peroxy)hexyne | [1068-27-5] | 286 | 0.89 | liquid | 1,850 (ip) |
| 2,5-dimethyl-2,5-di(benzoylperoxy)hexane | [2618-77-1] | 386 | 1.23 | | |
| 2,2'-bis(t-butyl-peroxy)-di-iso-propyl-benzene | [25155-25-3] | 338 | 0.93 | | >23,000 |
| 1,1-bis(t-butyl-peroxy)-3,3,5-trimethyl cyclohexane | [6731-36-8] | 302 | 0.91 | liquid | >13,000 |
| n-butyl 4,4-bis(t-butyl-peroxy) valerate | [995-33-5] | 334 | 0.95 | liquid | 5,000 |
| t-butyl perbenzoate | [614-45-9] | 194 | 1.04 | liquid | >3,600 |
| benzoyl peroxide | [94-36-0] | 242 | | | >5,000 |

*Reproduced from EncyclopediaofChemicalTechnology, Vol. 21, Fourth Ed., page 470

As previously noted, the preferred embodiment multi-piece core assemblies comprise an inner or center core component. The center core compositions preferably include cis-1,4 polybutadiene cured with sulfur or a sulfur curing agent. The sulfur cured polybutadiene may be combined with other elastomers, or blended together with other components or specific gravity controlling fillers and the like. Natural rubber, isoprene rubber, EPR, EPDM, styrene-butadiene rubber, or similar thermoset materials may be appropriately incorporated into the base rubber composition of the sulfur cured butadiene rubber to form the center core component. It is preferred to use butadiene rubber as a base material of the composition for both the central core component and the core layer(s). Thus, the same rubber composition, except for the specific curing agent, can be used in both the central component and core layer(s). However, different compositions can readily be used in the different layers, including thermoplastic materials such as a thermoplastic elastomer or a thermoplastic rubber, or a thermoset rubber or thermoset elastomer material.

The preferred polybutadiene for use in the core assemblies of the present invention feature a cis-1,4 content of at least 90% and preferably greater than 96% such as Cariflex® BR-1220 available from Dow Chemical, France; and Taktene® 220 available from Bayer, Orange, Tex.

As noted, the base rubber that is used in the center core component is cured with sulfur, or a sulfur-based curing agent. Examples of such curing agents include, but are not limited to those set forth above. An example of a commercially available sulfur suitable for forming the core components described herein is "Rubbermakers" type sulfur available from Stauffer Chemical, Wesport, Conn.

It may also, in some circumstances, be preferable to utilize a curing accelerator in forming the center core. Examples of suitable accelerators include, but are not limited to dibenzothiadyl disulfide, N,N'-diccyclohexyl-2-benzothiadylsulfenamide, hexamethylenetetramine, mercaptbenzothiazole, tetramethylthiuram disulfide, tetraethylthiuram disulfide, tetrabutylthiuram disulfide and the like.

Typically, the COR of the inner or central core is difficult to measure due to the relatively small size of the inner core. Accordingly, a drop rebound test is used in which the core component is dropped from a height of 100 inches onto a thick steel plate. For preferred embodiment cores having a low specific gravity, the preferred rebound is about 80 to 98 inches. For preferred embodiment cores having a higher specific gravity, the preferred rebound is generally less. This is believed to result from the incorporation of high levels of dense filler materials.

In this regard, drop rebound is a measure of the resilience of the core component. Generally, the higher the resilience of the core, the higher the drop rebound, all other factors being equal.

The preferred center or inner core component is very soft. Zinc diacrylate (ZDA) is generally not utilized in the preferred embodiment center or inner core components. The Shore A hardness of the preferred embodiment center or inner core component ranges from about 50 to about 95, more preferably from about 60 to about 90, and most preferably from about 70 to about 80. Generally, the specific gravity of the center core component is from about 1.0 to about 1.8. However, specific gravities less than 1.0 are also contemplated.

The core layer(s) disposed about the center or inner core component preferably comprise an effective amount of zinc diacrylate and are cured by the use of one or more peroxide curing agents. The outer core layer(s) have a hardness generally in the Shore C or Shore D range and are typically harder than a one piece solid core. The dual or multi-component core assemblies of the present invention are generally harder than one piece solid cores because the center or inner core component is relatively soft.

Hardness values for the outer core layer(s) are set forth below in Table 2 as follows:

TABLE 2

|  | Shore C | Shore D |
| --- | --- | --- |
| Typical | 50–95 | 30–65 |
| Preferred | 65–90 | 40–60 |
| Most Preferred | 80–85 | 53–57 |

The one or more core layers also comprise a polybutadiene, however preferably utilize a polybutadiene that is cured with a peroxide agent.

The free radical initiator included in the core layer compositions is any known polymerization initiator (a co-cross-linking agent) which decomposes during the cure cycle. The term "free radical initiator" as used herein refers to a chemical which, when added to a mixture of the elastomeric blend and a metal salt of an unsaturated, carboxylic acid, promotes cross-linking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.5 to about 4.0 and preferably in amounts of from about 1.0 to about 3.0 parts by weight per each 100 parts of elastomer and based on 40% active peroxide with 60% inert filler.

Exemplary of suitable peroxides for the purposes of the present invention are dicumyl peroxide, n-butyl 4,4'-bis (butylperoxy) valerate, 1,1-bis(t-butylperoxy) -3,3,5- trimethyl cyclohexane, di-t-butyl peroxide and 2,5-di-(t-butylperoxy) -2,5 dimethyl hexane and the like, as well as mixtures thereof. It will be understood that the total amount of initiators used will vary depending on the specific end product desired and the particular initiators employed.

Examples of such commercially available peroxides are Luperco® 230 or 231 XL sold by Atochem, Lucidol Division, Buffalo, N.Y., and Trigonox® 17/40 or 29/40 sold by Akzo Chemie America, Chicago, Ill. In this regard Luperco® 230 XL and Trigonox® 17/40 are comprised of n-butyl 4,4-bis (butylperoxy) valerate; and, Luperco® 231 XL and Trigonox® 29/40 are comprised of 1,1-bis(t-butylperoxy)-3,3,5-trimethyl cyclohexane. The one hour half life of Luperco® 231 XL is about 112° C., and the one hour half life of Trigonox® 17/40 is about 129° C. Trigonox® 42-40 B is preferred and is chemically tert-Butyl peroxy -3,5,5, trimethyl hexanoate.

The one or more core layers include the above noted materials as well as polyether or polyester thermoplastic urethanes, thermoset polyurethanes or metallocene polymers or blends thereof. For example, suitable metallocene polymers include foams of thermoplastic elastomers based on metallocene single site catalyst based foams. Such metallocene based foam resins are commercially available and are readily suitable for forming the outer core layer. Examples of a thermoset material include a rubber based, castable urethane or a silicone rubber. The silicone elastomer may be any thermoset or thermoplastic polymer comprising, at least partially, a silicone backbone. Preferably, the polymer is thermoset and is produced by intermolecular condensation of silanols. A typical example is a polydimethylsiloxane cross-linked by free radical initiators, or by the cross-linking of vinyl or allyl groups attached to the silicone through reaction with silyl hydride groups, or via reactive end groups. The silicone may include a reinforcing or non-reinforcing filler. Additionally, the present invention also contemplates the use of a polymeric foam material, such as a metallocene based foamed resin, for the core layers.

More particularly, a wide array of thermoset materials can be utilized in the core components of the present invention. Examples of suitable thermoset materials include polybutadiene, polyisoprene, styrene/butadiene, ethylene propylene diene terpolymers, natural rubber polyolefins, polyurethanes, silicones, polyureas, or virtually any irreversibly cross-linkable resin system. It is also contemplated that epoxy, phenolic, and an array of unsaturated polyester resins could be utilized.

The thermoplastic material utilized in the present invention golf balls and, particularly their dual cores, may be nearly any thermoplastic material. Examples of typical thermoplastic materials for incorporation in the golf balls of the present invention include, but are not limited to, ionomers, polyurethane thermoplastic elastomers, and combinations thereof. It is also contemplated that a wide array of other thermoplastic materials could be utilized, such as polysulfones, polyamide-imides, polyarylates, polyaryletherketones, polyaryl sulfones/polyether sulfones, polyether-imides, polyimides, liquid crystal polymers, polyphenylene sulfides, and specialty high-performance resins, which would include fluoropolymers, polybenzimidazole, and ultrahigh molecular weight polyethylenes.

Additional examples of suitable thermoplastics include metallocenes, polyvinyl chlorides, polyvinyl acetates, acrylonitrile-butadiene-styrenes, acrylics, styrene-acrylonitriles, styrene-maleic anhydrides, polyamides (nylons), polycarbonates, polybutylene terephthalates, polyethylene terephthalates, polyphenylene ethers/polyphenylene oxides, reinforced polypropylenes, and high-impact polystyrenes.

Preferably, the thermoplastic materials have relatively high melting points, such as a melting point of at least about 300° F. Several examples of these preferred thermoplastic materials and which are commercially available include, but are not limited to, Capron® (a blend of nylon and ionomer), Lexano® polycarbonate, Pebax® polyether amide, and Hytrel® polyester elastomer. The polymers or resin systems may be cross-linked by a variety of means such as by peroxide agents, sulfur agents, radiation or other cross-linking techniques, if applicable. However, the use of peroxide cross-linking agents is generally preferred in the present invention.

Any or all of the previously described components in the cores of the golf ball of the present invention may be formed in such a manner, or have suitable fillers added, so that their resulting density is decreased or increased. For example, heavy weight metals and/or filler materials are incorporated into the inner spherical center. This is discussed in more detail below.

Additionally, the core layers are formed or otherwise produced to be light in weight. For instance, the components could be foamed, either separately or in-situ. Related to this, a foamed light-weight filler agent or density reducing filler may also be added to the core layers.

The specially produced core assemblies of the present invention are manufactured using relatively conventional techniques. In this regard, the preferred core compositions (i.e., center, core layer, outer core layer, etc.) of the invention may be based on polybutadiene, and mixtures of polybutadiene with other elastomers. It is preferred that the base elastomers have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers such as polyisoprene may also be utilized. Most preferably, cis-polybutadiene having a weight-average molecular weight of from about 100,000 to about 500,000 is employed. Along this line, it has been found that the high cis-polybutadiene manufactured and sold by Dow France, tradename Cariflex® BR-1220, either alone or in combination with a polyisoprene available from The Goodyear Tire & Rubber Co., Akron, Ohio, under the designation Natsyn® 2200 is particularly well suited.

Although the use of metal carboxylate cross-linking agents is not preferred for the center core component, these cross-linkers may be included in the additional core layers. The unsaturated carboxylic acid component of the core composition (a co-cross-linking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 12 to about 40, and preferably from about 15 to about 35 parts by weight of the carboxylic acid salt, such as zinc diacrylate, is included in the outer core layers. The unsaturated carboxylic acids and metal salts thereof are generally soluble in the elastomeric base, or are readily dispersed. Other co-agents such as liquid monomers can be used. Examples of suitable co-agents include, but are not limited to, ethylene dimethacrylate; 1,3 butylene glycol dimethacrylate; and trimethylol propane trimethacrylate.

The core compositions of the present invention may additionally contain any other suitable and compatible modifying ingredients including, but not limited to, metal oxides, fatty acids, diisocyanates and polypropylene powder resin. For example, Papi® 94, a polymeric diisocyanate, commonly available from Dow Chemical Co., Midland, Mich., is an optional component in the rubber compositions. It can range from about 0 to 5 parts by weight per 100 parts by weight rubber (phr) component, and it acts as a moisture scavenger. In addition, it has been found that the addition of a polypropylene powder resin results in a core which is too hard (i.e. exhibits low compression) and thus allows for a reduction in the amount of cross-linking agent utilized to soften the core to a normal or below normal compression.

Furthermore, because polypropylene powder resin can be added to the core composition without an increase in weight of the molded core upon curing, the addition of the polypropylene powder allows for the addition of higher specific gravity fillers, such as mineral fillers. Since the cross-linking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide, calcium oxide and/or magnesium oxide are activators for the polybutadiene. The activator can range from about 2 to about 30 parts by weight per 100 parts by weight of the rubbers (phr) component.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

One or more of the core components may additionally comprise one or more of a variety of reinforcing or non-reinforcing heavy weight fillers or fibers such as metal (or metal alloy) powders, carbonaceous materials (i.e., graphite, carbon black, cotton flock, leather fiber, etc.), glass, Kevlar® fibers (trademarked material of DuPont for an aromatic polyamide fiber of high tensile strength and greater resistance to elongation than steel), etc. These heavy weight filler materials range in size from about 10 mesh to about 325 mesh, preferably about 20 mesh to about 325 mesh and most preferably about 100 mesh to about 325 mesh. Representatives of such metal (or metal alloy) powders include, but are not limited to, bismuth powder, boron powder, brass powder, bronze powder, cobalt powder, copper powder, inconel metal powder, iron metal powder, molybdenum powder, nickel powder, stainless steel powder, tungsten powder, titanium metal powder, zirconium oxide powder, aluminum flakes, and aluminum tadpoles. It will be understood that the foregoing materials may be in other forms besides powders.

Examples of various suitable heavy filler materials which can be included in the core assembly are as follows:

TABLE 3

| | Spec. Gravity |
|---|---|
| Filler Type | |
| graphite fibers | 1.5–1.8 |
| precipitated hydrated silica | 2.0 |
| clay | 2.62 |
| talc | 2.85 |
| asbestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfide | 4.1 |
| silicates | 2.1 |
| diatomaceous earth | 2.3 |
| calcium carbonate | 2.71 |
| magnesium carbonate | 2.20 |
| Metals and Alloys (powder) | |
| titanium | 4.51 |
| tungsten | 19.35 |
| aluminum | 2.70 |
| bismuth | 9.78 |
| nickel | 8.90 |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zirconium oxide | 5.73 |
| Metal Stearates | |
| zinc stearate | 1.09 |
| calcium stearate | 1.03 |
| barium stearate | 1.23 |
| lithium stearate | 1.01 |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the golf ball desired. Generally, lesser amounts of high specific gravity materials are necessary to produce a change in the moment of inertia in comparison to low specific gravity materials. Furthermore, handling and processing conditions can also affect the type of heavy weight filler material incorporated into cover layers.

The outer diameter of the center core component and the outer diameter of the outer core (core diameter) may vary. However, the center core component has a diameter of from about 0.35 inches (8.89 mm) to about 1.20 inches (30.48 mm), and preferably from about 0.40 inches (10.16 mm) to about 0.95 inches (24.13 mm). Most preferably, the center core component has a diameter of from about 0.60 inches (15.24 mm) to about 0.85 inches (21.59 mm). The outer core has a diameter of about 1.450 inches (36.83 mm) to about 1.650 inches (41.91 mm) inches and preferably 1.495 inches (37.97 mm) to 1.570 inches (39.88 mm), depending on the size of the center core and the finished size of the ball. However, it will be appreciated that inner or center core components having diameters that are larger or smaller than these noted ranges are encompassed by the present invention.

The core having a two-layer structure composed of the inner core and the outer core is referred to herein as a solid core or as a core assembly. The above expression is in contrast to a thread-wound core (core formed by winding a rubber thread around the center portion which is solid or filled with a liquid material).

The double or dual cores of the inventive golf balls typically have a coefficient of restitution of about 0.630 or more, more preferably 0.783 or more, and a PGA compression of about 105 or less, and more preferably 87 or less. The dual cores have a weight of from about 32 to about 41 grams and preferably from about 35 to about 38 grams.

As mentioned above, the present invention includes golf ball embodiments that utilize two or more core components. For example, in accordance with the present invention, a core assembly is provided that comprises a central core component and two or more core layers disposed about the central core component. Details for the second and third or more core layers are also included herein in the description of the core layer utilized in a dual core configuration.

COVER ASSEMBLY

The cover assembly comprises at least one cover layer. More preferably, the cover assembly comprises at least two layers: a first or inner cover layer and a second or outer cover layer. The first or inner cover layer is generally harder than the second or outer cover layer. The preferred cover layers can be ionomer, ionomer blends, non-ionomer, non-ionomer blends, or blends of ionomer or non-ionomer. These are described in greater detail as follows.

The inner layer of the cover is preferably comprised of a high acid (i.e. greater than 16 weight percent acid) ionomer resin or high acid ionomer blend. Preferably, the inner layer is comprised of a blend of two or more high acid ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost and improve processing without affecting the overall performance of the finished golf ball. The inner layer may alternatively be comprised of a low acid (i.e. 16 weight percent acid or less) ionomer blend. Preferably, the inner layer is comprised of a blend of two or more low acid (i.e. 16 weight percent acid or less) ionomer resins neutralized to various extents by different metal cations.

It has been found that a hard inner cover layer provides for a substantial increase in resilience (i.e. enhanced distance) over known multi-layer covered balls. The softer outer cover layer provides for desirable "feel" and high spin rate while maintaining respectable resiliency. The soft outer layer allows the cover to deform more during impact and increases the area of contact between the club face and the cover, thereby imparting more spin on the ball. As a result, the soft cover provides the ball with a balata-like feel and playability characteristics with improved distance and durability. Consequently, the overall combination of the inner and outer core layers and inner and outer cover layers results in a golf ball having enhanced resilience (improved travel distance) and durability (i.e. cut resistance, etc.) characteristics while maintaining, and in many instances improving, the playability properties of the ball.

The combination of the preferred hard inner cover layer with a soft, relatively low modulus ionomer, ionomer blend or other non-ionomeric thermoplastic elastomer outer cover layer provides for excellent overall coefficient of restitution (i.e. excellent resilience) because of the improved resiliency produced by the inner cover layer. While some improvement in resiliency is also produced by the outer cover layer, the outer cover layer generally provides for a more desirable feel and high spin, particularly at lower swing speeds with highly lofted clubs, such as half wedge shots.

The inner cover layer is preferably harder than the outer cover layer and generally has a thickness in the range of about 0.01 inches (0.25 mm) to about 0.12 inches (3.05 mm), preferably from about 0.03 inches (0.76 mm) to about 0.07 inches (1.78 mm) for a 1.68 inch (42.67 mm) ball and from about 0.05 inches 1.27 mm) (2.54 mm) to about 0.10 inches (2.54 mm) for a 1.72 inch (43.69 mm) (or more) ball. The inner cover layer has a Shore D hardness of 60 or more. It is particularly advantageous if the golf balls of the invention have an inner layer with a Shore D hardness of 65 or more. The above-described characteristics of the inner cover layer provide an inner ball having a PGA compression of 100 or less. It is found that when the inner ball has a PGA compression of 90 or less, excellent playability results.

The high acid ionomers which may be suitable for use in formulating the inner cover layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional co-monomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Several metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. application Ser. No. 08/493,089, now U.S. Pat. No. 5,688,869 incorporated herein by reference. It has been found that numerous metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

The base copolymer is made up of greater than 16% by weight of an alpha, beta-unsaturated carboxylic acid and an alpha-olefin. Optionally, a softening co-monomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening co-monomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening co-monomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening co-monomer. Preferably, the copolymer contains about 20% by weight unsaturated carboxylic acid and about 80% by weight ethylene. Most preferably, the copolymer contains about 20% acrylic acid with the remainder being ethylene.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi.

Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

Moreover, as a result of the development of a number of acrylic acid based high acid ionomer resins neutralized to various extents by several different types of metal cations, such as manganese, lithium, potassium, calcium and nickel cations, various new ionomers or ionomer blends are available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e. the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions are ionic copolymers which are the metal, i.e. sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional co-monomer such as an acrylate ester (i.e. iso- or n-butylacrylate, etc.) can also be included to produce a softer terpolymer. The carboxylic acid groups of the copolymer are partially neutralized (i.e. approximately 10–100%, preferably 30–70%) by the metal ions. Each of the low acid ionomer resins which may be included in the inner layer cover compositions of the invention contains 16% by weight or less of a carboxylic acid.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e. the inner cover layer herein) the resulting golf balls will travel further and at an enhanced spin rate than previously known multi-layered golf balls. Such an improvement is particularly noticeable in enlarged or oversized golf balls.

While the core with the hard inner cover layer formed thereon provides the multi-layer golf ball with power and distance, the outer cover layer is preferably comparatively softer than the inner cover layer. The softness provides for the feel and playability characteristics typically associated with balata or balata-blend balls. The outer cover layer or ply is comprised of a relatively soft, low modulus (about 1,000 psi to about 10,000 psi) and low acid ionomer, an ionomer blend, a non-ionomeric thermoplastic or thermosetting material such as, but not limited to, a metallocene catalyzed polyolefin such as Exact® material available from Exxon, a polyurethane, a polyester elastomer such as that marketed by DuPont under the trademark Hytrel®, or a polyether amide such as that marketed by Elf Atochem S.A. under the trademark Pebax®, a blend of two or more non-ionomeric thermoplastic or thermosetting materials, or a blend of one or more ionomers and one or more non-ionomeric thermoplastic materials.

The outer layer is preferably fairly thin (i.e. from about 0.010 inches (0.25 mm) to about 0.10 inches (2.54 mm) in thickness, more desirably from about 0.03 inches (0.76 mm) to about 0.06 inches (1.52 mm) in thickness for a 1.680 inch (42.67 mm) ball and from about 0.03 inches (0.76 mm) to about 0.06 inches (1.52 mm) in thickness for a 1.72 inch (43.69) or more ball), but thick enough to achieve desired playability characteristics while minimizing expense. Thickness is defined as the average thickness of the non-dimpled areas of the outer cover layer. The outer cover layer preferably has a Shore D hardness of 60 or less, and more preferably 55 or less. As will be understood, the outer cover layer is preferably dimpled. Preferably, the overall thickness for a multi-layer cover is from about 0.040 inches ((1.02 mm) to about 1.20 inches (30.48 mm).

For a given copolymer, the olefin is selected from the group consisting of olefins having 2 to 8 carbon atoms, including, as non-limiting examples, ethylene, propylene, butene-1, hexene-1 and the like. Preferably, the olefin is ethylene.

The acrylate ester is an unsaturated monomer having from 1 to 21 carbon atoms which serves as a softening co-monomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening co-monomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, alpha-chloroacrylic, crotonic, maleic, fumaric, and itaconic acid, or the like, and half esters of maleic, fumaric and itaconic acid, or the like. The acid group of the copolymer is 10–100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50 to 100%.

The one or more acrylate ester-containing ionic copolymers each has an individual Shore D hardness of about 5 to 64. The overall Shore D hardness of the outer cover is 60 or less, and generally is 40 to 55. It is preferred that the overall Shore D hardness of the outer cover is in the range of 40 to 50 in order to impart particularly good playability characteristics to the ball.

The outer cover layer of the invention is formed over a core or core assembly to result in a golf ball having a coefficient of restitution of at least 0.760, more preferably at least 0.770, and most preferably at least 0.780. The coefficient of restitution of the ball will depend upon the properties of both the core and the cover. The PGA compression of the golf ball is 100 or less, and preferably is 90 or less.

The acrylate ester-containing ionic copolymer or copolymers used in the outer cover layer can be obtained by neutralizing commercially available acrylate ester-containing acid copolymers such as polyethylene-methyl acrylate-acrylic acid terpolymers, including Escor® ATX (Exxon Chemical Company) or poly (ethylene-butyl acrylate-methacrylic acid) terpolymers, including Nucrel® (DuPont Chemical Company). Particularly preferred commercially available materials include ATX 320, ATX 325, ATX 310, ATX 350, and blends of these materials with Nucrel® 010 and Nucrel® 035. The acid groups of these materials and blends are neutralized with one or more of various cation salts including zinc, sodium, magnesium, lithium, potassium, calcium, manganese, nickel, etc. The degree of neutralization ranges from about 10 to 100%. Generally, a higher degree of neutralization results in a harder and tougher cover material.

The ionomer resins used to form the outer cover layers can be produced by reacting the acrylate ester-containing acid copolymer with various amounts of the metal cation salts at a temperature above the crystalline melting point of the copolymer, such as a temperature from about 200° F. to about 500° F., preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the copolymer. When two or more different copolymers are to be used, the copolymers can be blended before or after neutralization. Generally, it is preferable to blend the copolymers before they are neutralized to provide for optimal mixing.

The compatibility of the acrylate ester-containing copolymers with each other in a copolymer blend produces a golf ball outer cover layer having a surprisingly good scuff resistance for a given hardness of the outer cover layer. The golf ball according to the invention has a scuff resistance of no higher than 3.0. It is preferred that the golf ball has a scuff resistance of no higher than about 2.5 to ensure that the golf ball is scuff resistant when used in conjunction with a variety of types of clubs, including sharp-grooved irons, which are particularly inclined to result in scuffing of golf ball covers. The best results according to the invention are obtained when the outer cover layer has a scuff resistance of no more than about 2.0.

The outer layer may include a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another alpha, beta-unsaturated carboxylic acid, and an unsaturated monomer of the acrylate ester class having from 1 to 21 carbon atoms. The soft ionomer is preferably made from an acrylic acid base polymer in an unsaturated monomer of the acrylate ester class.

Certain ethylene-acrylic acid based soft ionomer resins developed by the Exxon Corporation under the designation Iotek® 7520 (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e. fewer rejects) as well as significant cost savings versus the outer layer of multi-layer balls produced by other known hard-soft ionomer blends as a result of the lower overall raw materials costs and improved yields.

In addition, it is within the purview of this invention to add to the cover compositions of this invention compatible materials which do not affect the basic novel characteristics of the composition of this invention. Among such materials are antioxidants (i.e. Santonox®), titanium dioxide, antistatic agents, stabilizers and processing aids. The cover compositions of the present invention may also contain softening agents, such as plasticizers, etc., and reinforcing materials such as glass fibers and inorganic fillers, as long as the desired properties produced by the golf ball covers of the invention are not impaired.

Furthermore, optical brighteners, such as those disclosed in U.S. Pat. No. 4,679,795, herein incorporated by reference, may also be included in the cover composition of the invention. An example of a suitable optical brightener which can be used in accordance with this invention is Uvitex® OB as sold by the Ciba-Geigy Chemical Company, Ardsley, N.Y. Uvitex® OB is thought to be 2,5-Bis(5-tert-butyl-2-benzoxazoly)thiophene. Examples of other optical brighteners suitable for use in accordance with this invention are as follows: Leucopure® EGM, as sold by Sandoz, East Hanover, N.J. 07936 (Leucopure® EGM is thought to be 7-(2n-naphthol(1,2-d)-triazol-2yl)-3phenyl-coumarin); Phorwhite® K-20G2, as sold by Mobay Chemical Corporation, P.O. Box 385, Union Metro Park, Union, N.J. 07083 (thought to be a pyrazoline derivative); Eastobrite® OB-1, as sold by Eastman Chemical Products, Inc. Kingsport, Tenn. (thought to be 4,4-Bis(-benzoxaczoly) stilbene). The above-mentioned Uvitex® OB and Eastobrite® OB-1 are preferred optical brighteners for use in accordance with this invention.

Moreover, since many optical brighteners are colored, the percentage of optical brighteners utilized must not be excessive or the optical brightener will function as a pigment or dye in its own right.

The percentage of optical brighteners which can be used in accordance with this invention is from about 0.01 % to about 0.5% as based on the weight of the polymer used as a cover stock. A more preferred range is from about 0.05% to about 0.25%, with the most preferred range from about 0.10% to about 0.20%, depending on the optical properties of the particular optical brightener used and the polymeric environment in which it is a part.

Generally, the additives are admixed with an ionomer to be used in the cover composition to provide a masterbatch (M.B.) of desired concentration, and an amount of the masterbatch sufficient to provide the desired amounts of additive is then admixed with the copolymer blends.

Preferred embodiment golf balls typically exhibit Shore D cover hardnesses preferably from about 35 to about 59, and most preferably from about 40 to about 50.

Figure 2:
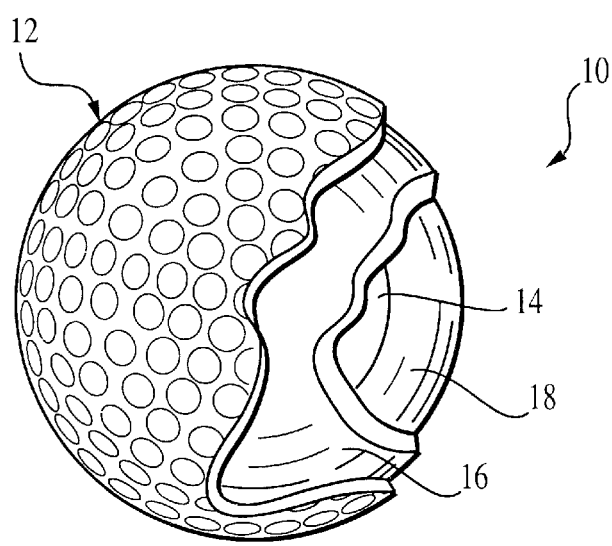
FIG. 2 is a diametrical cross-sectional view of the preferred embodiment golf ball depicted in FIG. 1 having a dual core assembly and a cover comprising an inner layer surrounding the core and an outer layer having a plurality of dimples.

FIGS. 1 and 2 illustrate a preferred embodiment golf ball 10 in accordance with the present invention. It will be understood that none of the referenced figures are to scale, and the thicknesses and proportions of the various layers and the diameter of the various core components are not necessarily as depicted. The golf ball 10 comprises a multi-layered cover about a dual core assembly. The dual core assembly includes a center core component 14 and a core layer 18 disposed thereon. The center component of the core 14 of the golf ball 10 can be formed of a cis-1,4 polybutadiene and a sulfur curing agent. The outer core layer component 18 preferably comprises a material selected from the group consisting of thermosets, thermoplastics and combinations thereof. More preferably, the outer core layer component 18 comprises a peroxide cured polybutadiene. FIG. 1 shows an outer layer cover 12 disposed around an inner layer 16 which in turn is disposed about the dual core component.

Figure 3:
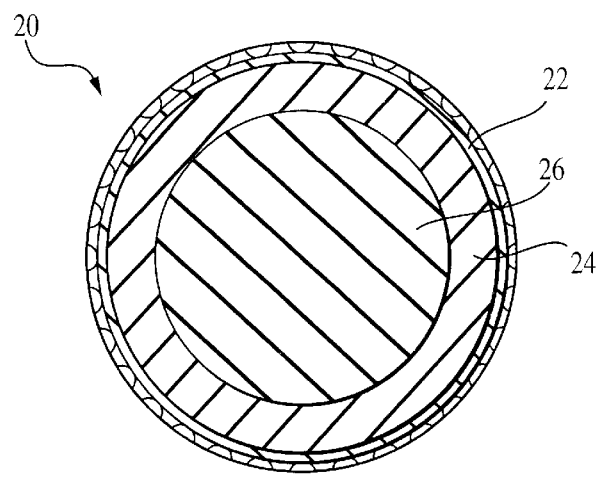
FIG. 3 is a cross-sectional view of another preferred embodiment golf ball in accordance with the present invention comprising a dual core assembly and a single layer cover.

FIG. 3 illustrates another preferred embodiment golf ball 20 in accordance with the present invention. The golf ball 20 comprises a single layer cover that is disposed around a dual core assembly. The cover 22 may include a soft (low acid) ionomer resin and a hard (high acid) ionomer resin blend. The dual core assembly comprises a center core component 26 and a core layer 24 disposed on the center core component. The center core component 26 of the dual core is preferably a sulfur cured polybutadiene material. The core layer component 24 preferably comprises a material selected from the group consisting of thermosets, thermoplastics and combinations thereof. More preferably, the outer core layer component 24 comprises a peroxide cured polybutadiene.

Figure 4:
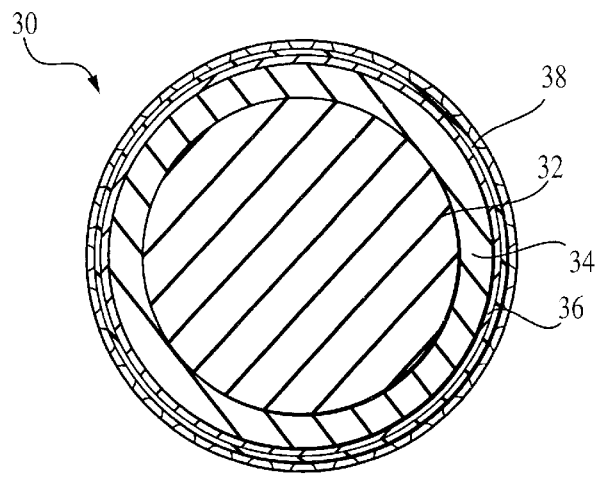
FIG. 4 is a cross-sectional view of another preferred embodiment golf ball in accordance with the present invention comprising a dual core assembly.

FIG. 4 illustrates yet another preferred embodiment golf ball 30 in accordance with the present invention. The golf ball 30 comprises a multilayered cover that is disposed around a dual core assembly. The outer layer of the cover 38 includes a soft (low acid) ionomer resin and a hard (high acid) ionomer resin blend. The inner layer of the cover 36 preferably includes an ionomer resin having at least 16% acid. The center core component 32 is preferably a sulfur cured polybutadiene. The outer core component 34 is preferably a peroxide cured polybutadiene.

METHODS OF MAKING PREFERRED EMBODIMENT GOLF BALLS

In preparing preferred embodiment golf balls in accordance with the present invention, a hard inner cover layer is molded (such as by injection molding or by compression molding) about a core (preferably a dual core). A comparatively softer outer cover layer is molded over the inner cover layer.

The dual cores of the present invention are preferably formed by compression molding techniques. However, it is fully contemplated that liquid injection molding or transfer molding techniques could be utilized. It is also envisioned that a reaction injection molding technique could be utilized to form one or more of the core or cover components. Preferably, inner cores are compression molded, but may also be transfer or injection molded. The outer core or core layer is preferably compression molded. And preferably, the cover is injection molded but can also be compression or reaction injected molded (RIM).

Figure 5:
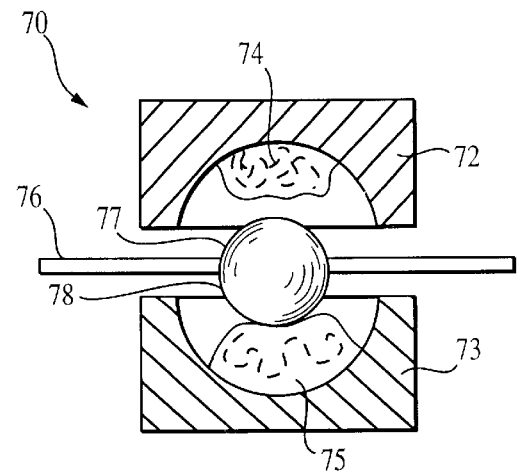
FIG. 5 is a schematic view of an assembly used for molding a preferred embodiment golf ball in accordance with the present invention.

Referring to FIG. 5, preforms 75 of a thermoset material, i.e. utilized to form the core layer, are preheated in an oven for one-half hour at 170° F. and placed in the bottom 73 of a molding assembly 70. A Teflon-coated plate 76 with two hemispheres 77 and 78, each about 0.840 inches in diameter, is placed on top of the preforms. Additional preforms 74, preheated as described above, are placed in the corresponding cavities of a top mold 72. The bottom mold 73 is engaged with the top mold 72 and the assembly flipped or otherwise inverted. The bottom one half of the mold assembly 70 then becomes the top one half of the mold assembly. The mold assembly 70 is then placed in a press and cold formed at room temperature using approximately 10 tons of pressure in a steam press. The molding assembly 70 is closed for approximately two minutes and pressure released. The molding assembly 70 is then opened and the Teflon plate 76 is removed thereby leaving one or more essentially perfectly formed one-half shells in cavities in the thermoset material. Previously formed thermoset or thermoplastic core centers are then placed in the bottom cavities and the top portion 72 of the molding assembly 70 is placed on the bottom 73 and the materials disposed there between cured.

A series of trials were performed in which various preferred embodiment core components, core assemblies, and golf balls according to the present invention were produced. In Examples 1–4 set forth below, golf balls having a high MOI, i.e. a low specific gravity inner core, were produced. And in Examples 5 and 6, golf balls having a low MOI, i.e. a high specific gravity inner core, were produced.

EXAMPLE 1

A DUAL CORE GOLF BALL WITH A SULFUR CURED CENTER COMPONENT

A spherical center core component that is sulfur cured and having a diameter of 0.84 inches (21.34 mm) was formed with the compositions indicated in Table 4 set forth below (all amounts are parts by weight unless indicated otherwise):

TABLE 4

| Sulfur Cured Inner Core Component Inner Core Stock | |
|---|---|
| BCP-820 | 40 |
| NeoCis ® 40 | 30 |
| NeoCis ® 60 | 30 |
| Zinc Oxide | 4.0 |
| Stearic Acid | 2.0 |
| Hi Sil ™ 233 | 7.0 |
| Vanox ™ 1290 | 1.0 |
| Sulfur | 5.25 |
| Amax ™ | 1.75 |
| DOTG | 1.00 |
| Bismate ™ | 0.35 |
| TOTAL | 122.35 |

The spherical center core component produced from the above composition exhibited a specific gravity of 1.015.

Zinc diacrylate (ZDA) is not included in the composition of the center core component of this specific embodiment of the present invention. Zinc diacrylate is normally added to core compositions in golf ball production in order to increase hardness.

Various spherical inner core components were molded from the formulations in Table 4 above. Slugs having a weight of 5.6 to 5.7 grams were molded in a four cavity press with cavity diameters of 0.856 inches. Using 150 psi steam for 13 minutes, inner cores were produced having the following properties set forth in Table 5:

TABLE 5

| Average Weight | 5.08 g |
|---|---|
| Size (diameter) | 0.835–0840" |
| Average Rebound | 86–88" |

Additionally, various core components were subjected to varying cure times and their corresponding drop rebounds were measured (all drop rebounds noted herein are the rebound height after dropping a core or ball from a height of 100 inches):

TABLE 6

| Steam (150 psi) Duration (minutes) | Drop Rebound Height |
|---|---|
| 10 | 88–90 inches |
| 13 | 86–88 inches |
| 20 | 84–86 inches |

Two different outer core layers were formed about the spherical center core component based upon the formulations presented above. The outer diameter of the resulting dual core assembly was 1.560 inches. The outer core layers were formed with the following compositions set forth in Table 7:

TABLE 7

|  | A | B |
|---|---|---|
| BCP-820 | 40 | 40 |
| NeoCis ® 40 | 30 | 30 |
| NeoCis ® 60 | 30 | 30 |
| Zinc Oxide | 22.5 | 10.5 |
| Zinc Stearate | 16.0 | 16.0 |
| Zinc Diacrylate | 30 | 35 |
| Blue Master Batch | 0.1 | 0.0 |
| Red Master Batch | 0.05 | 0.0 |
| Yellow Master Batch | 0.0 | 0.1 |
| Trigonox ® 42-40B | 1.25 | 1.25 |
| TOTAL | 169.90 | 162.85 |

The resulting dual core assemblies exhibited the following properties set forth below in Table 8:

TABLE 8

|  | A | B |
|---|---|---|
| Diameter (inches) | 1.553–1.559 | 1.553–1.559 |
| Weight (grams) | 37.13 | 35.6 |
| Compression | 105 (Riehle) | 87 (Riehle) |
| Coefficient of Restitution | .764 | 0.791 |

After molding the noted outer core layers on the inner core components, two different cover formulations were molded on the dual cores. Various properties of two specific golf balls resulting from such production are set forth below in Table 9.

TABLE 9

|  | A | B |
|---|---|---|
| Inner Core |  |  |
| Specific Gravity | 1.015 | 1.015 |
| Diameter (inches) | 0.835 | 0.835 |
| Outer Core |  |  |
| Specific Gravity | 1.18 | 1.129 |
| Diameter (w/inner core) (inches) | 1.560 | 1.560 |
| Cover |  |  |
| Specific Gravity | 0.97 | 1.161 |
| Diameter (w/inner & outer core) (inches) | 1.680 | 1.680 |

TABLE 9-continued

|  | A | B |
|---|---|---|
| TOTAL BALL WEIGHT (grams) | 45.48 | 45.622 |
| M.O.I. (Calculated)(ounce/in$^2$) | 0.4495 | 0.4599 |

In addition, several dual cores from Batch A were molded with a formulation previously used in the cover of Aero™ balls produced by Spalding Sports. The finished balls exhibited a size of 1.683 inches. The compression (Riehle) ranged from 71 to 76, with an average Riehle compression of 73. The coefficient of restitution ranged from 0.804 to 0.808, with an average coefficient of restitution of 0.807.

EXAMPLE 2

Sulfur Cured Inner Core with 0.630 Inch Diameter

Center core components from Example 1, Table 4 were molded in a 16 cavity mold with 0.638 inch diameter cavities. A ten minute steam cycle was employed to produce a 2.09 gram molded component. The size measured off the equator was 0.620 inches, and 0.630 inches off the pole. After exposing the molded stock to a paint shaker for twenty minutes, the diameter was measured to be 0.623 inches and the weight was 2.07 grams.

Next, a core layer was formed about the noted center core components. The formulation for the core layer was according to formulation A, Table 7, above, and preformed using four minutes steam and ten minutes of water. These parameters produced a dual core assembly with the following properties set forth in Table 10:

TABLE 10

| Size (pole) (inches) | 1.550 |
|---|---|
| Size (eq) (inches) | 1.559 |
| Weight (grams) | 37.7 |
| Compression (Riehle) | 81 |
| C.O.R. | 0.789 |

A cover layer was then formed about the dual core assembly. When white masterbatch was used for the outside cover at a specific gravity of 1.161, the core layer specific gravity was found to be 1.118, since the cover weight was determined to be 9.111 grams. Thus, the specific gravity of the molded center core component was 1.015.

EXAMPLE 3

Sulfur cured center core components according to the compositions set forth in Table 4 above, were used. These sulfur cured center core components had a diameter of 0.835 inches.

A core layer was formed about the centers with the following composition, set forth below in Table 11:

TABLE 11

| BCP 820 | 40 |
|---|---|
| NeoCis ® 40 | 30 |
| NeoCis ® 60 | 30 |
| Zinc Oxide | 10.5 |
| Zinc Stearate | 16.0 |
| Zinc Diacrylate | 36 |

TABLE 11-continued

| | |
|---|---|
| Orange Master Batch | 0.1 |
| Trigonox ® 42-40B | 1.25 |
| TOTAL | 163.85 |

The core layers were formed as follows. Each one-half slug weight ranged from 17.5 to 18.5 grams and was formed using a removable plate. The pre-form was set for 3 minutes at a 96 psi after a 3 minute steam set point at 320° F. Cold water was then applied for 10 minutes. The forming plate was removed and the sulfur cured cores were placed in the middle of the uncured preforms. The mold was closed and the cores were final cured for 12 minutes with steam at 320° F. and 10 minutes of cooling water.

The resulting dual core assembly exhibited the following physical characteristics, as set forth in Table 12:

TABLE 12

| | |
|---|---|
| Size (pole) (inches) | 1.553 |
| Size (eq) (inches) | 1.556 |
| Weight (grams) | 35.88 |
| Compression (Riehle) | 79 |
| C.O.R. | 0.796 |

Covers were then formed about the dual core assemblies. 9.54 g of cover stock was used.

EXAMPLE 4

A golf ball exhibiting a high moment of inertia and a final diameter of 1.68 inches (42.67 mm) was formed using a thick, heavy core layer disposed about a high sulfur cured core component as follows.

A sulfur cured inner core component as previously described was obtained. That inner core component had a diameter of 0.622 inches and a specific gravity of 1.015.

A core layer was formed about the inner core. The product listed below in Table 13 for the outer core layer stock had a specific gravity of 1.110.

TABLE 13

| | |
|---|---|
| BCP-820 | 40 |
| NeoCis ® 40 | 30 |
| NeoCis ® 60 | 30 |
| Zinc Oxide | 11.0 |
| Zinc Stearate | 16.0 |
| Zinc Diacrylate | 28 |
| Green Master Batch | 0.1 |
| Trigonox ® 42-40B | 1.25 |
| TOTAL | 156.35 |

The dual core assembly of the above described ball exhibited the following physical characteristics listed in Table 14:

TABLE 14

| | |
|---|---|
| Size (pole) (inches) | 1.517 (1.511–1.520) |
| Size (eq) (inches) | 1.512 (1.504–1.517) |
| Weight (grams) | 32.84 |
| Compression (Riehle) | 96 |
| C.O.R. | 0.786 |

The following cover formulation was used, as set forth in Table 15:

TABLE 15

| Materials | Parts by Weight | Specific Gravity |
|---|---|---|
| Surlyn ® 8150 | 33 | 0.95 |
| Surlyn ® 9150 | 33 | 0.95 |
| Surlyn ® 6120 | 34 | 0.95 |
| Titanium Dioxide | 31.3 | 4 |
| Eastobrite ® OB-1 | 0.35 | 1.2 |
| Ultramarine Blue ™ | 0.6 | 1.2 |
| Santonox ® | 0.05 | 1.2 |
| TOTALS | 132.3 | 1.161 |

The finished golf balls exhibited the following characteristics, listed in Tables 16 and 17:

TABLE 16

| Ball # | Pole (inches) | Off/Equa (inches) | Weight(g) | Compression (Riehle) | COR |
|---|---|---|---|---|---|
| 1 | 1.6838 | 1.6828 | 45.62 | 58 | 0.8023 |
| 2 | 1.6829 | 1.6839 | 45.58 | 58 | 0.8074 |
| 3 | 1.6843 | 1.6839 | 45.62 | 56 | 0.8027 |
| 4 | 1.6827 | 1.6833 | 45.57 | 55 | 0.8031 |
| 5 | 1.6840 | 1.6854 | 45.59 | 54 | 0.8047 |
| 6 | 1.6835 | 1.6853 | 45.57 | 57 | 0.8071 |
| 7 | 1.6832 | 1.6840 | 45.56 | 57 | 0.8033 |
| 8 | 1.6860 | 1.6850 | 45.67 | 56 | 0.8024 |
| 9 | 1.6874 | 1.6856 | 45.74 | 58 | 0.7733 |
| 10 | 1.6832 | 1.6852 | 45.56 | 57 | 0.8075 |
| 11 | 1.6836 | 1.6817 | 45.52 | 58 | 0.8023 |
| 12 | 1.6843 | 1.6859 | 45.60 | 56 | 0.8014 |
| Min | 1.6827 | 1.6817 | 45.52 | 54 | 0.7733 |
| Max | 1.6874 | 1.6859 | 45.74 | 58 | 0.8075 |
| Avg | 1.6841 | 1.6843 | 45.60 | 56.7 | 0.801458 |
| Std | 0.001341 | 0.00128 | 0.058153 | 1.302678 | 0.00913 |

The average MOI (moment of inertia) of the balls of Table 16 is 0.45956 (actual measurement).

TABLE 17

| Ball # | Pole (inches) | Off/Equa (inches) | Weight (g) | Compression (Riehle) | COR |
|---|---|---|---|---|---|
| 1 | 1.6825 | 1.6829 | 45.36 | 58 | 0.8114 |
| 2 | 1.6828 | 1.6822 | 45.33 | 61 | 0.8094 |
| 3 | 1.6820 | 1.6820 | 45.30 | 61 | 0.8107 |
| 4 | 1.6818 | 1.6813 | 45.28 | 62 | 0.8090 |
| 5 | 1.6820 | 1.6819 | 45.26 | 62 | 0.8018 |
| 6 | 1.6812 | 1.6821 | 45.34 | 61 | 0.8097 |
| 7 | 1.6835 | 1.6841 | 45.35 | 61 | 0.8099 |
| 8 | 1.6810 | 1.6821 | 45.30 | 60 | 0.8089 |
| 9 | 1.6820 | 1.6812 | 45.36 | 62 | 0.8076 |
| 10 | 1.6828 | 1.6812 | 45.35 | 59 | 0.7907 |
| 11 | 1.6818 | 1.6818 | 45.32 | 59 | 0.8087 |
| 12 | 1.6817 | 1.6799 | 45.35 | 60 | 0.8113 |
| Min | 1.6810 | 1.6799 | 45.26 | 58 | 0.7907 |
| Max | 1.6835 | 1.6841 | 45.36 | 62 | 0.8114 |
| Avg | 1.6821 | 1.6819 | 45.33 | 60.5 | 0.8074 |
| Std | 0.000713 | 0.00101 | 0.033166 | 1.314257 | 0.00582 |

The average MOI of the balls of Table 17 is 0.45465 actual measurement).

EXAMPLE 5

In this example, a dual core golf ball with a sulfur cured inner core having a low MOI, i.e. a high specific gravity inner core, is produced.

A dual core golf ball with a sulfur cured inner core was formed using the following composition set forth below in Table 18 for the center core component:

TABLE 18

| | |
|---|---|
| Cariflex ® BR 1220 | 70 |
| Taktene ® 220 | 30 |
| Zinc Oxide | 4 |
| Stearic Acid | 2 |
| Hi Sil ™ 243 LD | 7 |
| Vanox ™ 1290 | 1 |
| Tungsten | 114 |
| Sulfur | 14 |
| Durax ™ | 1.75 |
| DPG (N,N$_1$-Di phenyl Guanidine) | 1.00 |
| Bismate ™ | 0.35 |
| TOTAL | 245.1 |

The core formed exhibited a specific gravity which was calculated to be 1.858. The slug weight average of the above formation ranged from 9.5 to 9.6 grams. The cores were formed by molding techniques, where each cavity was 0.865 inches in diameter, for 15 minutes at full steam of 320° F., under a 500 psi gauge pressure, which was followed by an 8 minute water cooling.

A drop rebound test was conducted using the core components formed from the composition set forth in Table 18. The results of this test are set forth in Table 19:

TABLE 19

| Steam Time (minutes) | Drop Rebound (inches) |
|---|---|
| 11 | 83 |
| 13 | 84 |
| 15 | 83 |
| 17 | 81 |
| 19 | 79 |

The center components for the dual cores were also measured to have the following data, listed below in Table 20:

TABLE 20

| | |
|---|---|
| Size (pol)(inches) | 0.845 |
| Size (off eq.)(inches) | 0.840 |
| Average size (inches) | 0.842 |
| Weight (grams) | 9.55 |

Core layers were formed using 15.5 gram one-half slug weight preforms. The slugs were pre-warmed for twenty minutes at 80° C. (176° F.). The one-half shells were then molded about the previously described sulfur cured inner cores. The final mold was set for 12 minutes at 320° F. with a set point gauge pressure of 500 psi and 10 minutes of water. The cavity size used in the mold was 1.530 inches.

Two different outer core layer formulations were used, as set forth below in Table 21:

TABLE 21

| | A | B |
|---|---|---|
| Cariflex ® BR 1220 | 70 | 70 |
| Taktene ® 220 | 30 | 30 |
| Zinc Oxide | 5 | 5 |
| Zinc Stearate | 10 | 10 |
| Zinc Diacrylate | 30 | 40 |
| Luperco ® 231 XL | 0.9 | 0.9 |
| TOTALS | 145.9 | 155.9 |

The dual cores formed using the above described compositions exhibited the following physical characteristics, listed in Table 22:

TABLE 22

| | A | B |
|---|---|---|
| Size (inches) | 1.495–1.500 | 1.495–1.500 |
| Weight (g) | 35.1 | 35.8 |
| Shore C | 85 | 92 |
| Shore D | 50 | 58 |
| C.O.R. | 0.762 | 0.783 |
| Compression | 116 | 79 |

The finished golf balls having centers ranging from 1.495 inches (37.97 mm) to 1.50 inches (38.10 mm) were covered with a cover exhibiting a Shore D hardness of 66. In addition, the following physical characteristics of the resulting golf balls were noted and set forth in Table 23:

TABLE 23

| | (A core) | (B core) |
|---|---|---|
| Size (inches) | 1.679–1.680 | 1.679–1.680 |
| Weight (g) | 45.80 | 46.48 |
| Compression (Riehle) | 76 | 57 |
| Compression (PGA) | 84 | 103 |
| C.O.R. | 0.803 | 0.809 |

EXAMPLE 6

In this example, a dual core golf ball with a sulfur cured inner core having a low MOI, i.e. a high specific gravity inner core, is produced.

Dual cores for golf balls were formed with a diameter of 1.570 inches (39.88 mm) with the following composition for the center core component, set forth in Table 24:

TABLE 24

| | |
|---|---|
| Cariflex ® BR 1220 | 70 |
| Taktene ® 220 | 30 |
| Zinc Oxide | 4.0 |
| Stearic Acid | 2 |
| Hi Sil ™ 243 LD | 7 |
| Vanox ™ 1290 | 1 |
| Barytes #22 | 47 |
| Sulfur | 14 |
| Durax ™ | 1.75 |
| DPG | 1.00 |
| Bismate ™ | 0.35 |
| TOTALS | 178.10 |

The core formulation listed above was formed into 7.2 gram slugs that were subsequently molded using 15 minutes of steam at a gauge pressure of 500 psi followed by 8 minutes of water. The center component of the dual cores exhibited the following average characteristics noted in Table 25:

TABLE 25

| | |
|---|---|
| Weight (grams) | 6.659 |
| Size (inches) | 0.840 |
| Drop rebound (inches) | 82 |
| Shore A | 90 |
| Shore C | 47 |
| Shore D | 26 |
| Specific Gravity | 1.300 |

Plaques formed from this composition exhibited the following average hardnesses:

TABLE 26

| | |
|---|---|
| Shore A | 76 |
| Shore C | 44 |
| Shore D | 24 |

A core layer component was formed about the previously described sulfur cured inner core component using the following compositions listed in Table 27:

TABLE 27

| | |
|---|---|
| Cariflex ® BR 1220 | 70 |
| Taktene ® 220 | 30 |
| Zinc Oxide | 6 |
| Zinc Stearate | 15 |
| T.G. Regrind | 20 |
| Zinc Diacrylate | 35 |
| Luperco ® 231 XL | 0.9 |
| TOTAL | 176.9 |

The core layers described above were formed into one-half slugs. The 18.5 gram slugs were molded around the previously described sulfur cured cores in an electric press for 12 minutes at 320° F. and then put in a cold press for 10 minutes. The outer shells above exhibited a specific gravity of 1.136.

The resultant dual cores exhibited the following characteristics, noted in Table 28:

TABLE 28

| | |
|---|---|
| Size (pole)(inches) | 1.611 |
| Size (equator)(inches) | 1.600 |
| Weight (grams) | 40.3 |
| Compression (Riehle) | 83 |
| C.O.R. | 0.785 |

These dual cores were then finished to a final diameter of 1.57 inches.

EXAMPLE 7

In another trial, a series of inner cores were prepared. These cores utilized a peroxide-cure composition in contrast to a sulfur-cure formulation. These peroxide-cured cores were then compared to the previously described sulfur-cured cores. These inner core formulations are set forth below in Table 29:

TABLE 29

| | |
|---|---|
| BCP-820 | 40 |
| NeoCis ® 40 | 30 |
| NeoCis ® 60 | 30 |
| Zinc oxide | 4 |
| Zinc stearate | 1 |
| SR-351 | 3 |
| Hi Sil ™ | 3 |
| Orange Master Batch | 0.1 |
| Luperco ® 231 XL | 1 |
| TOTAL | 112.1 |

These cores were then subjected to 12 minutes of steam at 150 psi and then 12 minutes of cooling water. The cores were compared to corresponding sulfur cured cores. All sulfur cured cores exhibited higher drop rebounds.

The invention has been described with reference to the preferred embodiments. Obviously, modifications and alterations will occur to others upon a reading and understanding of the preceding detailed description. It is intended that the invention be construed as including all such modifications and alterations in so far as they come within the scope of the appended claims or the equivalents thereof.

What is claimed:

1. A golf ball comprising:
    a center core component formed from a first composition comprising a cis-1,4 polybutadiene and a sulfur curing agent, wherein said sulfur curing agent comprises at least one of N-oxydiethylene 2-benzothiazole sulfenamide, N,N-di-orthotolyguanidine, bismuth dimethyldithiocarbamate, N-cyclohexl 2-benzothiazole sulfenamide, N,N-diphenylguanidine or combinations thereof;
    at least one core layer disposed about said center core component thereby forming an intermediate ball, said core layer formed from a second composition comprising a cis-1,4 polybutadiene and a peroxide curing agent; and
    at least one cover layer disposed about said core layer thereby forming said golf ball.
2. The golf ball of claim 1 wherein said center core component has a diameter of from about 0.35 inches to about 1.20 inches.
3. The golf ball of claim 2 wherein said center core component is free of zinc diacrylate.
4. The golf ball of claim 1 wherein said core layer has a diameter of from about 1.450 inches to about 1.650 inches.
5. The golf ball of claim 1 wherein said golf ball has a Shore D cover hardness of from about 35 to about 90.
6. The golf ball of claim 1 wherein said polybutadiene utilized in at least one of said first composition and said second composition has a cis-1,4 content greater than 90 percent.
7. The golf ball of claim 1 wherein said center core component has a specific gravity of from about 1.0 to about 1.8.
8. The golf ball of claim 1 wherein said center core component exhibits a specific gravity of less than 1.0.
9. The golf ball of claim 1 wherein said center core component comprises microballoons, cellular foam materials, or combinations thereof.
10. The golf bail of claim 1 wherein said first composition also comprises an accelerator.
11. A golf ball comprising:
    a center core component formed from a first composition comprising a cis-1,4 polybutadiene and a sulfur curing agent;

at least one core layer disposed about said center core component thereby forming an intermediate ball, said core layer formed from a second composition comprising a cis-1,4 polybutadiene and a peroxide curing agent; and at least one cover layer disposed about said core layer thereby forming said golf ball;

wherein said first composition also comprises an accelerator; and wherein said accelerator comprises at least one of mercaptobenzothiazoles, sulfenamides, dithiocarbamates, thiuram sulfides, guanidines, thioureas, xanthates, dithiophosphates, aldehyde-amines, dibenzothiadyl disulfide, N,N'-diccyclohexyl-2-benzothiadylsulfenamide, hexamethylenetetramine, mercaptbenzothiazole, tetramethylthiuram disulfide, tetraethylthiuram disulfide, tetrabutylthiuram disulfide or combinations thereof.

12. The golf ball of claim 1 wherein said peroxide curing agent comprises at least one of dicumyl peroxide; 2,5-dimethyl-2,5-di(t-butylperoxy) hexane; 2,5-dimethyl-2,5-di(t-butylperoxy) hexyne; 2,5-dimethyl-2,5-di(benzoylperoxy) hexane; 2,2'-bis(t-butylperoxy)-di-iso-propylbenzene;1,1-bis(t-butylperoxy)-3,3,5-trimethyl cyclohexane; n-butyl 4,4-bis(t-butyl-peroxy) valerate; t-butyl perbeuzoate; benzoyl peroxide; t-butyl peroxy-3,5,5 trimethylhexanoate or combinations thereof.

13. A golf ball comprising:

a generally spherical inner core component formed from a first composition including (i) a cis-1, 4 polybutadiene having a cis-1, 4 content greater than 90 percent, (ii) a sulfur curing agent comprising at least one of N-oxydiethylene 2-benzothiazole sulfenamide, N,N-di-orthotolyguanidine, bismuth dimethyldithiocarbamate, N-cyclohexyl 2-benzothiazole sulfenamide, N,N-diphenylguanidine or combinations thereof, and (iii) an accelerator comprising at least one of mercaptobenzothiazoles, sulfenamides, dithiocarbamates, thiruam sulfides, guanidines, thioureas, xanthates, dithiophosphates, aldehyde-amines, dibenzothiadyl disulfide, N,N'-diccyclohexyl-2-benzothiadylsulfenamide, hexamethylenetetramine, mercaptbenzothiazole, tetramethylthiuram disulfide, tetraethylthiuram disulfide, tetrabutylthiuram disulfide or combinations thereof;

at least one core layer disposed on said inner core component, said core layer formed from a second composition including (i) a cis-1,4 polybutadiene having a cis-1,4 content greater than 90 percent, and (ii) a peroxide curing agent comprising at least one of dicumyl peroxide; 2,5-dimethyl-2,5-di(t-butylperoxy) hexane; 2,5-dimethyl-2,5-di(t-butylperoxy) hexyne; 2,5-dimethyl-2,5-di(benzoylperoxy) hexane; 2,2'-bis(t-butylperoxy)-di-iso-propylbenzene; 1,1-bis(t-butylperoxy)-3,3,5-trimethyl cyclohexane; n-butyl 4,4-bis(t-butyl-peroxy) valerate; t-butyl perbenzoate; benzoyl peroxide; n-butyl 4,4'-bis(butylperoxy) valerate; di-t-butyl peroxide; 2,5-di-(t-butylperoxy) -2,5 dimethyl hexane; or combinations thereof; and at least one cover layer disposed on said core Layer.

14. The golf ball of claim 13 wherein said cis-1,4 polybutadiene of one of said first composition and said second composition has a cis-1,4 content greater than 96 percent.

15. The golf ball of claim 13 wherein at least one of said, inner core component, said core layer, and said cover layer comprises a heavy weight filler comprising at least one of graphite, precipitated hydrated silica, clay, talc, asbestos, glass aramid fibers, mica, calcium metasilicate, barium sulfate, zinc sulfide silicates, diatomaceous earth, calcium carbonate, magnesium carbonate, titanium, tungsten, aluminum, bismuth, nickel, molybdenum, iron, copper, brass, boron, bronze, cobalt, beryllium, zinc, tin, zinc oxide, iron oxide, aluminum oxide, titanium oxide, magnesium oxide, zirconium oxide, zinc stearate, calcium stearate, barium stearate, lithium stearate, magnesium stearate, carbon black, natural bitumen, cotton flock, cellulose flock, leather fiber, or combinations thereof.

* * * * *